United States Patent Office 3,608,292
Patented Sept. 28, 1971

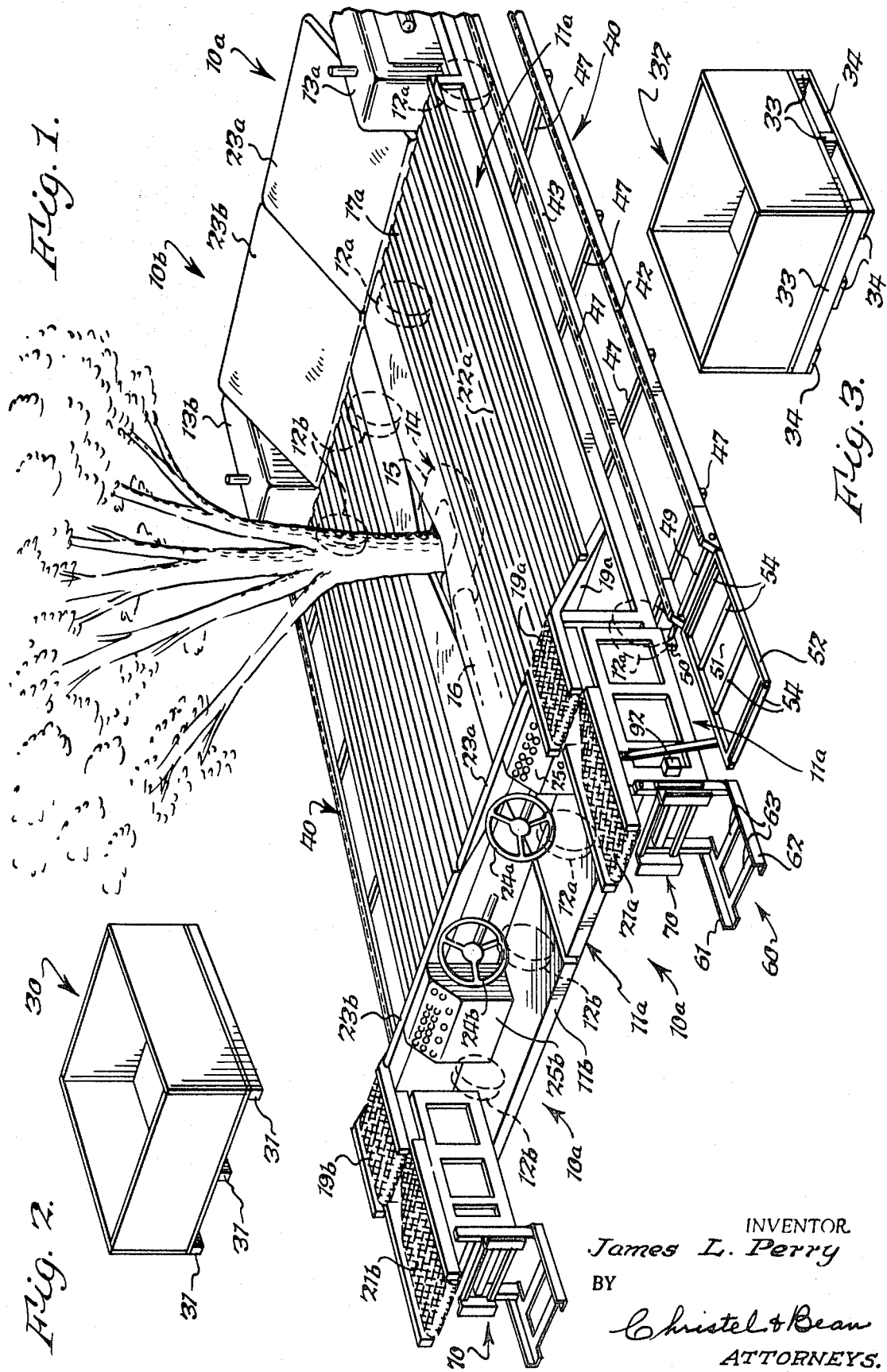

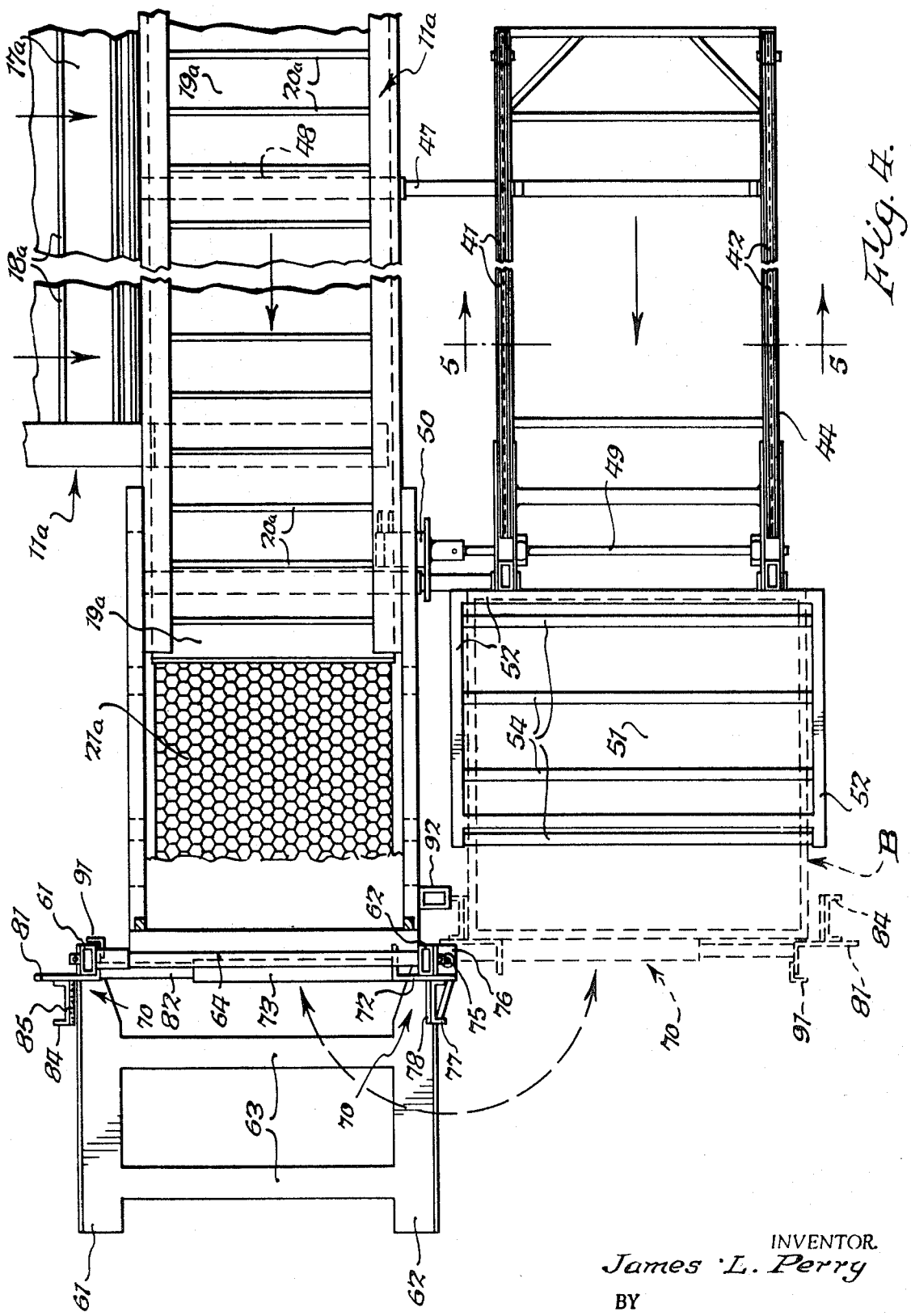

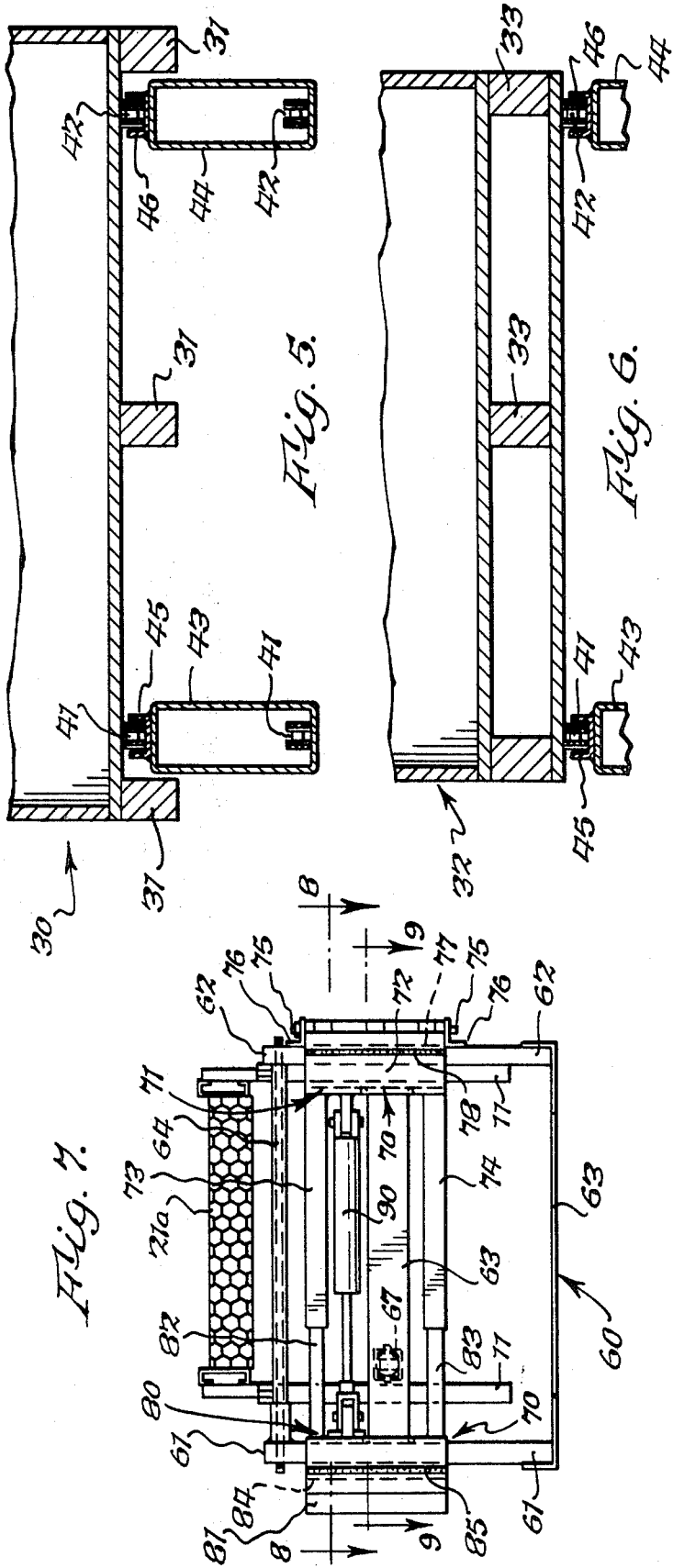

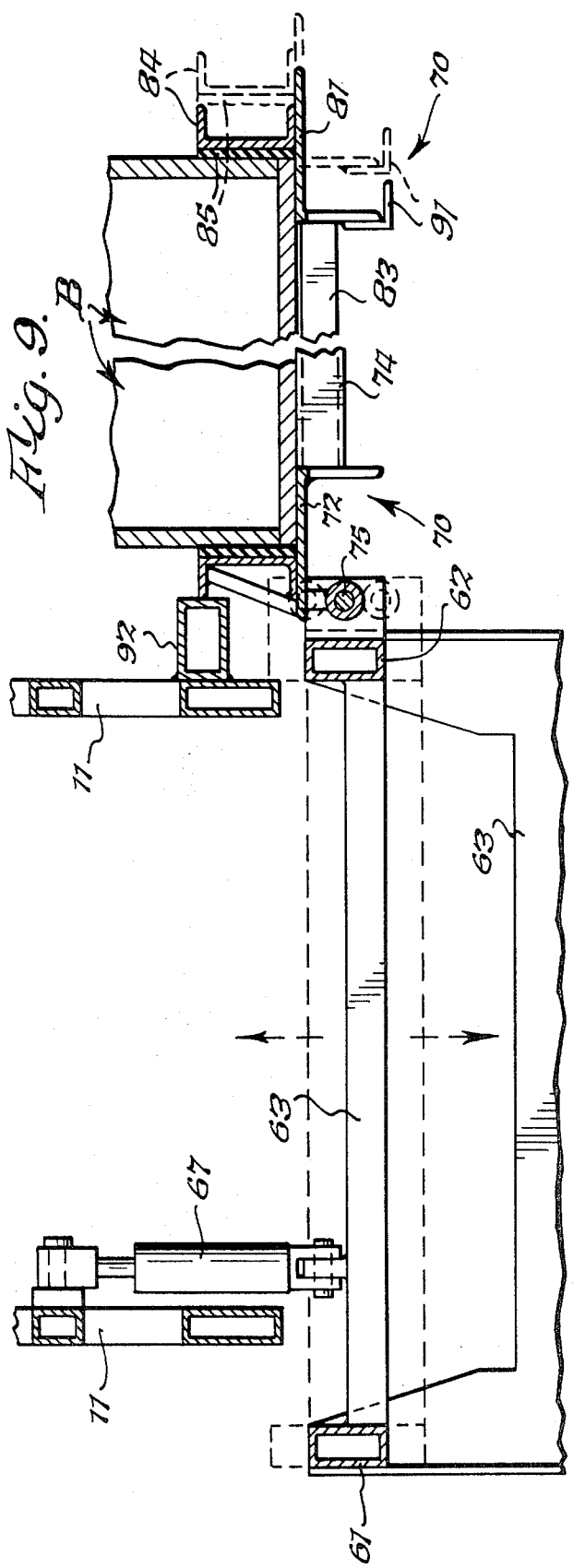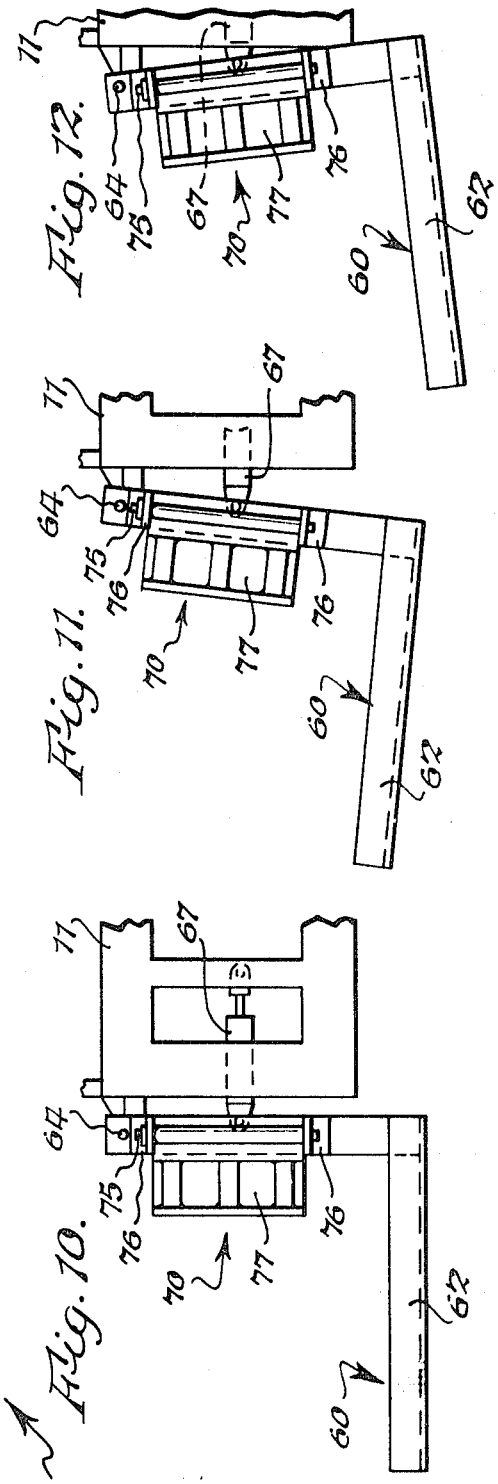

3,608,292
COLLECTION SYSTEM FOR HARVESTING MACHINES
James L. Perry, 4025 Hartland Road, Gasport, N.Y. 14067
Filed Jan. 20, 1970, Ser. No. 4,281
Int. Cl. A01g *19/06*
U.S. Cl. 56—329      14 Claims

ABSTRACT OF THE DISCLOSURE

A crop collection system for harvesting machines of the type having shaker means carried by an ambulatory frame and including conveying means in the frame for receiving removed crops and transporting them to a point of collection relative to the frame. A plurality of crop receiving bins or receptacles are carried with the machine frame by means of a conveyor attached to one side of the fame which moves the bins, one at a time, toward the point of crop collection. A bin carrying means pivotally mounted on the machine frame and moved by means of an hydraulic cylinder elevates a bin to where the open end thereof is in communication with the point of crop collection and gradually lowers the bin as it is filled. The bins are placed on the carrying means one at a time by a clamping means pivotally connecting to the carrying means and including movable jaws operatively connecting to an hydraulic cylinder. The clamping means is moved toward the conveyor to grip a bin and returned, with the bin, so as to place the bin on the carrying means.

BACKGROUND OF THE INVENTION

The present invention relates to harvesting machines and, more particularly, to a crop collection system for use with such machines.

Mechanical apparatus for harvesting fruit from trees is becoming increasingly accepted and desired as a substitute for human labor. Such apparatus includes, briefly, an ambulatory frame moved through the orchard either by separate or self-contained drive means, and a shaker mechanism on the frame adapted to contact a tree and impart a vibratory motion thereto. There is included within the frame a conveying means adapted to receive the fruit as it is removed by the vibratory motion and to transport the fruit to a particular location relative to the frame from where it is collected by means of receptacles or bins.

In mechanized harvesting with apparatus of this general type, a significant problem arises in the collection of the removed crops. Heretofore when harvesting was done exclusively by human labor, the receptacles or bins for collecting the removed crops were placed at spaced locations around the field or orchard. With mechanized harvesting, however, such placing of bins on the ground prior to movement of the machine through the field is undesirable for several reasons. The bins often must be taken from the ground and placed near the location on the machine from which crops will exit, and when a bin is filled it must be removed from near the machine. This procedure requires either additional men in the the field or the harvesting machine operator to leave his position and perform the tasks, both of which are in conflict with economy in the harvesting operation. Moreover, the placing of the bins on the ground beforehand will slow down movement of the harvester betwen trees or plants. In particular, although harvesting machinery of the aforementioned type has been designed and constructed so as to be highly maneuverable among closely-spaced plants or trees, the bins placed on the ground beforehand present additional obstacles to the movement of the machine.

In addition to being an obstacle to movement of the machine through a field, the bins so placed also preclude advantageous utilization of the high operating capacity of machines presently available. This is because much time is lost both in the movement of the machine around the prepositioned bins and the delays associated with the aforementioned procedure wherein each bin must be taken to the machine, positioned for filling, and removed when full.

SUMMARY OF THE INVENTION

It is, therefore, an object of this invention to provide a crop collection system for harvesting machines wherein a plurality of bins or receptacles are movable with the machine prior to their individual filling and wherein each bin is automatically moved into position for filling.

It is a more particular object of this invention to provide such a system which carries a plurality of bins along with the machine frame, places each bin in a position for filling and in a manner such that the crops as they fall in the bin experience little, if any damage from bruising, and leaves the bin on the ground after it has been filled.

It is a further object of the present invention to provide such a collection system which will operate equally well with bins or receptacles of various sizes and constructions.

It is a further object of the present invention to provide such a collection system which will not impair or detract from the high degree of maneuverability and low profile already designed into existing harvesting machines.

The present invention provides a crop collecting system for harvesting machines of the type having shaker means carried by an ambulatory frame wherein removed crops are transported to a point of collection relative to the frame. A plurality of crop receiving bins or receptacles are carried with the machine frame and conveyed along the frame toward the point of crop collection. A clamping means carried by the machine frame is moved into position to grasp a bin and then is returned with the bin to a position where it places the bin on a carrying means. The bin is then raised by the carrying means to an elevated position where the open end of the bind is in communication with the point of crop collection on the machine frame. After crops enter the bin and proceed to fill it, the carrying means is moved to lower the bin gradually thereby maintaining substantially constant the distance through which the crops fall. When the bin has filled, the carrying means is moved further so that the bin may be left on the ground as the machine is moved away.

The foregoing and additional advantages and characterizing features of the present invention will become clearly apparent upon a reading of the ensuing detailed description of an illustrative embodiment thereof together with the included drawing depicting the same.

BRIEF DESCRIPTION OF THE DRAWING FIGURES

FIG. 1 is a perspective view of a harvesting machine provided with a crop collection system according to the present invention;

FIG. 2 is a perspective view of one type of bin or receptacle for use with the collection system of the present invention;

FIG. 3 is a perspective view of a second type of bin or receptacle for use with the collection system of the present invention;

FIG. 4 is a fragmentary plan view of the harvesting machine of FIG. 1 and showing in more detail the collection system of the present invention the bin pick-up position of the clamp mechanism being shown in broken lines;

FIG. 5 is a sectional view taken on line 5—5 in FIG. 4 and showing a receptacle of the type in FIG. 2 as it would appear supported on the collection system conveyor;

FIG. 6 is a sectional view similar to FIG. 5 but showing a receptacle of the type in FIG. 3 supported on the same conveyor;

FIG. 7 is a fragmentary elevational view of the harvesting machine of FIG. 1 and showing in detail the portion of the collection system which grips and moves the receptacles to and from the point of crop collection;

FIG. 8 is an enlarged sectional view taken about on line 8—8 in FIG. 7;

FIG. 9 is an enlarged sectional view taken about on line 9—9 in FIG. 7 but with the clamping means extended and gripping a receptacle, the open or release position of the clamping means being indicated in broken lines;

FIGS. 10–12 are fragmentary elevational views showing the bin-carrying portion of the collection system of the present invention in horizontal, upward and downward pivoted positions, respectively.

DETAILED DESCRIPTION OF THE ILLUSTRATED EMBODIMENT

FIG. 1 is a perspective view of a harvesting machine 10 provided with a crop collection system according to the present invention and showing machine 10 as it would appear in a typical use, harvesting fruit from a tree. In this particular illustration harvesting machine 10 is of the type consisting of a first part 10a and a second part 10b whch are moved into abutting relationship with each other on opposite sides of the trunk of the tree. While the crop collection system of the present invention will be described in conjunction with a harvesting machine of this type, it can be employed in other types of harvesting machines wherein it is desired that a plurality of bins or receptacles be carried by the machine prior to their individual filling and that each receptacle be moved automatically into a position for filling.

Referring now to the machine designated 10a in FIG. 1, a frame indicated generally at 11a is movable in a field between the various plants by means of four wheels, each designated 12a, rotatably connected to frame 11a and drivenly coupled in a suitable manner to an engine 13a mounted on frame 11a. Engine 13a preferably is of the internal combustion type although other suitable power sources can be employed, and frame 11a alternatively could be moved by attachment to a separate vehicle, such as a tractor, rather than being self-propelled. The maneuverability of frame 11a is enhanced by the fact that each of the wheels 12a is mounted to frame 11a in a manner so as to be independently steerable through an angle of 360 degrees.

Harvesting machine 10a further includes shaking means, indicated generally at 14 in FIG. 1, carried by frame 11a and adapted to contact a plant or tree and impart vibratory motion thereto for removing crops. In this illustrative example harvesting machine 10a is of the type particularly suitable for removing fruit from trees, and, therefore, shaking means 14 comprises a generally C-shaped member 15 disposed in a horizontal plane and at a level whereby it can grasp the tree trunk. Shaking means 14 further comprises a coupling 16 from member 15 to a suitable drive means carried by frame 11a for vibrating the C-shaped member 15. Alternatively, machine 10a can have shaking means in the form of an arm or boom having jaws or a clamp at one end thereof, a universal mounting near the midpoint thereof to frame 11a, and manually-operable controls at the other end thereof. An operator standing on the ground alongside machine 10a swings the arm or boom into position so that it can grasp the tree near the limbs, and then after closing the clamp or jaws on a part of the tree, the operator activates a suitable drive mechanism which reciprocates the arm to impart vibratory motion to the tree.

As a result of the vibratory motion imparted to the plant, the crops removed therefrom fall by gravity down toward the machine frame. Machine 10a further includes conveying means to frame 11a adapted to receive fruit removed from the tree and transport it to a point of collection relative to machine frame 11a. Referring momentarily to FIG. 4, the conveying means in this particular harvesting machine includes a first belt conveyor 17a which travels in a direction perpendicular to and out or away from the side of frame 11a which contacts the tree or plant. Conveyor 17a can be of rubber or other suitable materials, is provided with spaced ribs 18a to facilitate transporting of crops, and is relatively wide so that it occupies a major portion of the length of machine frame 11a. The length of conveyor 17a is such that one end thereof is relatively close to the side of machine frame 11a which contacts the tree or plant and the other end of conveyor 17a is spaced a relatively larger distance from the opposite side of frame 11a. Located below this end of belt conveyor 17a is a second belt conveyor 19a included in the machine conveying means which conveyor 19a travels in a direction perpendicular with respect to conveyor 17a. Conveyor 19a preferably is of a width about equal to the amount by which the end of conveyor 17a is spaced from the side of frame 11a, and conveyor 19a likewise can be of rubber and provided with a series of spaced ribs 20a to facilitate transporting of crops. Conveyor 19a extends along frame 11a for a substantial portion of the length thereof at a level below that of conveyor 17a, whereupon conveyor 19a is inclined upwardly for a small portion of its length and then returns to a horizontal disposition for another short portion thereof. These portions of conveyor 19a are seen most clearly in FIG. 1. Conveyor 19a moves in a direction so as to transport crops toward this elevated portion and hence to a point of collection.

At this end of conveyor 19a there can be positioned a sizer 21a which comprises a wire mesh belt conveyor of a relatively short length and disposed generally horizontally at a level below the elevated end of the conveyor 19a. The wire mesh is of a size sufficient to support the harvested crops but to allow passage therethrough of extraneous matter such as any leaves or stems which also happen to be removed from the plant. Sizer 21a is moved in the same direction that conveyor 19a is moved, so the outer or opposite end of sizer 21a constitutes the point of crop collection from machine 10a. Alternatively, if sizer 21a is not included in machine 10a, the point of crop collection would be the outermost end of the elevated portion of conveyor 19a.

Harvesting machine 10a also is equipped with an arrangement for cushioning the fall of fruit from the tree onto conveyors 17a and 19a. A plurality of narrow, closely spaced strips 22a of cloth or similar resilient material are positioned in a horizontal plane slightly above the level of conveyor 17a as shown in FIG. 1. Strips 22a preferably extend in a direction perpendicular to the direction of travel of conveyor 17a, are attached at each end to machine frame 11a, and can be supported at spaced intervals by orthogonally-disposed cushioning strips (not shown) attached at opposite ends to the other sides of machine frame 11a. As the fruit upon being removed from the tree falls toward the machine, it first lands on the strip 22a and is decelerated prior to landing on the machine belt conveyors 17a, 19a. The spacing and resiliency of the strips 22a is such as to provide the required deceleration while allowing the fruit to pass through easily to the conveyors.

A pair of deflector panels, each designated 23a in FIG. 1, also are provided, one at each of two opposite ends of machine 10a, for the purpose of deflecting back toward conveyor 17a any crops which happen to be propelled in a direction away from conveyor 17a by the vibratory motion imparted thereto. Panels 23a are secured to machine frame 11a in a manner permitting adjustment of their respective degrees of inclination.

Steering of machine 10a is performed hydraulically and under control of a manually-operated wheel 24a. The particular one or pair of wheels 12a which are turned by steering wheel 24a is selected by means of an hydraulic valve, the control levers of which are included in a control console 25a positioned on machine frame 11a near steering wheel 24a. Console 25a includes other control members and indicators associated with the various functions performed by machine 10a.

It was mentioned previously that harvesting machine 10 includes a first part 10a and a second part 10b which are moved into abutting relationship with each other and in contact with opposite sides of the trunk of a tree. The foregoing description has been with reference to part 10a shown on the right-hand side of FIG. 1. Part 10b, shown to the left in FIG. 1 is identical to part 10a in all but one respect, and similar parts are designated by the same number but followed by the letter b. Machine part 10b is different in not including a shaking means but instead is provided with a sealing means (not shown) having a generally semi-circular shape and extending inwardly from the side of machine frame 11b in contact with the tree. The sealing means seals frame 11b against the tree trunk thereby preventing loss of removed fruit and permitting contact between both machine frames 11a and 11b.

Once the removed crops reach the point of collection on harvesting machine 10, it is desired that they be placed in receptacle or bins for storage prior to subsequent handling or processing. In fruit gathering, the structure of bins or receptacle differs among various geographical locations. One type of bin is designated generally at 30 in FIG. 2 and is an open-top box, preferably of wood, having a width and length each of about 47 inches and a height of about 24 inches. Attached to the bottom of receptacle 30 are three depending leg members 31 in the form of wooden studs each 3½ inches high, 2½ inches wide and 47 inches long. The overall height of receptacle 30, therefore, is about 28 inches. Leg members 31 preferably are equally spaced, two extending along opposite outer edges of bin 30 and the third midway therebetween. When receptacle 30 is positioned on a supporting surface, such as the ground, leg members 31 rest on the surface or ground and provide open spaces between the surface and the bottom of receptacle 30. This facilitates handling and lifting by means of a fork lift, the two prongs of which can be inserted into the open spaces.

A second type of receptacle used in fruit harvesting at other geographic locations is shown at 32 in FIG. 3. It is an open-top, rectangular shaped box having a length of about 47 inches and a width of about 42 inches. The height measured from the bin bottom is about 27 inches, and receptacle 32 likewise has three depending leg members 33 attached to the bottom thereof and extending lengthwise thereof. Each leg member 33 comprises a wooden stud 3½ inches high, 2½ inches wide and 47 inches long, and the three leg members 33 are spaced equally with two along opposite outer edges of receptacle 32 and the third midway therebetween. In addition, receptacle 32 is provided with three wooden slats 34 attached to the bottoms of legs 33 and equally spaced at right angles to leg members 33. Each of the slats 34 is about one inch thick and 4 inches wide, and receptacle 32 consequently has an overall height of about 31 inches. The spacing between the bottom of receptacle 32 and the top of slats 34, like the spacing in receptacle 30, facilitates handling and lifting by means of a fork lift.

In accordance with the present invention, harvesting machine 10 is provided with a crop collection system wherein a plurality of bins or receptacles are movable with the machine prior to filling and wherein each bin is automatically moved into a position for filling. The collection system operates equally well with receptacles or bins of different construction, such as receptacles 30 and 32, and the system will not hamper the high degrees of maneuverability and low profile already designed into existing harvesting machines. Harvesting machine 10 is of two part construction and in the present illustration is provided with a crop collection system on each part. The system on part 10a will be described in detail hereafter, it being understod that an identical collection system is provided on machine part 10b. It should also be apparent that other types of harvesting machines may require only a single crop collection system.

The collection system of the present invention includes a conveyor 40, shown in detail in FIGS. 1 and 4-6, carried by machine frame 11 and adapted to move a plurality of bins or receptacles along a row. Conveyor 40 is positioned along the side of machine frame 11 opposite the side which contacts the tree, and comprises first and second continuous chains 41 and 42, respectively, which are spaced apart and which extend along a substantial portion of the length of machine frame 11. Chains 41 and 42 are supported by corresponding housing members 43 and 44 which are shown most clearly in FIGS. 1 and 5. A pair of generally U-shaped channel members 45 and 46 are mounted on the upper surface of corresponding ones of housing members 43 and 44 in a manner whereby the flanges thereof are disposed vertically. As shown in FIG. 5, chains 41 and 42 are assembled in conveyor 40 in a manner such that the upper portion of each chain is movably supported by a corresponding channel member 45, 46 and the lower portion of each chain is movable within a corresponding housing member 43, 44. Housing members 43, 44 are attached to a series of rigid bars 47, each of which in turn is fitted into a corresponding connecting member 48 fixed to machine frame 11 as shown in FIGS. 1 and 4. Bars 47 and members 48 are disposed perpendicular with respect to housing members 43, 44 and are included at spaced locations relative to the side of frame 11. In addition, the fitting of bars 47 into connecting members 48 can be releasably whereby the entire conveyor 40 is removable from frame 11 to facilitate shipping thereof.

Each of the chains 41 and 42 is operatively connected to a sprocket (not shown) positioned within a corresponding housing member 43 and 44, and the sprockets are mounted on a shaft 49 which is drivenly connected to an hydraulic motor 50 carried by machine frame 11. At their opposite ends chains 41 and 42 train about idler gears. Chains 41, 42 are moved in a direction so that receptacles or bins placed on the top portions thereof are moved generally toward the point of crop collection relative to machine frame 11.

Conveyor 40 is extended at the end thereof nearest the point of crop collection by a platform 51 disposed horizontally and at a level slightly below the level of the upper portions of chains 51 and 42. Platform 41 comprises a generally rectangular frame 52, one side of which is attached at spaced locations to conveyor housing members 43, 44. An adjacent side of frame 51 is attached to machine frame 11 by suitable means, such as arm member 53. A series of roller members 54 are included in platform 51, each roller member being journaled at opposite ends in frame 52 and being disposed at a right angle to the direction of travel of receptacles supported on chains 41, 42. It will be recalled that leg members 31 and 33 depending from the bottoms of receptacles 30 and 32, respectively, provide an open space under the receptacle bottom to facilitate gripping thereof by a fork lift type machine. A receptacle of the type shown at 30 in FIG. 2 is placed on conveyor 40 with the receptacle bottom resting on chains 41, 42 in the manner shown in FIG. 5, thereby providing a relatively large surface area to accommodate any shifting of the receptacle as it moves along conveyor 40. A receptacle of the type shown at 32 in FIG. 3 is positioned on conveyor 40 with slats 34 resting on chains 41 and 42, as shown in FIG. 6.

In order to be placed at the point of crop collection, the receptacles must first be removed from conveyor 40 by an arrangement which will be described in detail hereafter. The provision of platform 51 facilitates this removal, it being of a sufficient width so that the depending receptacle leg members can rest on platform 51. In addition, the level of platform 51 is about four inches below the level of the upper portions of chains 41, 42 so that as receptacles leave the portion of conveyor 40 including chains 41, 42, they are easily moved into position on platform 51. In particular, this four inch differential provides the needed clearance for leg members 31 of receptacle 30 to move onto platform 51 as the receptacle bottom moves from its position on chains 41, 42. This arrangement of conveyor driven portion 40 and platform 51 positioned a short distance below allows the collection system of the present invention to accommodate various types of bins while taking advantage of the economy and efficiency of a chain-type conveyor.

The collection system of the present invention further comprises means 60 adapted to carry a bin or receptacle and movable with respect to the point of crop collection relative to harvesting machine frame 11. In preferred form, carrying means 60 comprises two L-shaped frame members 61 and 62 fixedly spaced apart by intermediate frame members 63 as shown in FIGS. 4 and 7. Frame members 61 and 62 are spaced apart a distance sufficient to accommodate various sized bins, such as bins 30 and 32, the bottoms of which are supported on the lower or generally horizontal portion of carrying means 60. Carrying means 60 also could be considered an extension or portion of the machine frame movable with respect to the point of crop collection. In addition, carrying means 60 is pivotally mounted near or at the upper end thereof to a portion of machine frame 11 at a point slightly below the point of crop collection and in a manner whereby the lower portion or supporting surface of carrying means 60 is movable with respect to the point of crop collection on machine 10. In the present instance, frame members 61 and 62 are connected at corresponding ends thereof to a rod 64 which, in turn, is rotatably supported at spaced locations therealong on the portion of machine frame 11 slightly below the outer or exit end of sizer 21. Carrying means 60 is moved about this pivot point, defined by rod 64, by means of an hydraulic cylinder 67 as shown in FIGS. 10–12. One end of hydraulic cylinder 67 is fixed to a portion of machine frame 11 and the other end is attached to an intermediate frame member 63 included in the generally vertical portion of carrying means 60. Hydraulic fluid for operating cylinder 67 is supplied from a suitable source on machine 10, and control thereof provided by a suitable valve operated from console 25. The operation of cylinder 67 to move carrying means 60 during crop collection will be described in further detail hereafter.

The crop collection system of the present invention further comprises clamping means 70 adapted to grip a bin or receptacle and movable in a manner whereby it first grasps a bin waiting on platform 51 and then places the bin on carrying means 60. As shown in FIG. 7, clamping means 70 in preferred form comprises a first or frame portion 71 having a body 72 and first and second spaced apart members 73 and 74, respectively, each member 73, 74 being hollow throughout a substantial portion of the length thereof. Body 72 in the present illustration is pivotally mounted on carrying means 60 in a manner whereby the pivot axis thereof is perpendicular with respect to the bottom portion of carrying means 60 on which a bin or receptacle is supported. In particular, body 72 is rotatably connected to a rod 75 in the manner of a hinge, and rod 75, in turn, is journaled at each end thereof in a pair of brackets, each designated 76 in FIG. 7, which are fixed to frame portion 62 of carrying means 60 at vertically spaced locations.

Body 72 is extended outwardly relative to machine frame 11 by a channel member 77 which is attached, as by welding, along one flange thereof to body 72. Member 77 therefor is disposed so that the central web thereof is in a plane perpendicular with respect to the plane of body 72, thereby defining a first jaw of clamping means 70. A pad 78 of frictional material is attached to the web of member 77 to enhance the gripping action thereof.

Clamping means 70 further comprises a second or movable portion 80 having a body 81 and first and second spaced apart members 82 and 83, respectively. Members 82, 83 are spaced apart a distance and each are of a size so as to be slidably received in corresponding ones of the spaced-apart hollow members 73, 74 of frame portion 71. Body 81 is extended outwardly relative to machine frame 11 by a channel member 84 which is attached, as by welding, along one flange thereof to body 81. Member 84 is disposed so that the central web thereof is in a plane perpendicular with respect to the plane of body 81. In addition, the web of member 84 is disposed in a plane parallel to that of the web member 77. The web of member 84, therefore defines a second jaw of clamping means 70, and a pad 85 of frictional material is attached to the web to enhance the gripping action thereof.

Frame portion 71 and movable portion 80 of clamping means 70, and therefore the first and second jaws thereof, are moved together and apart by means of an hydraulic cylinder 90 operatively connected thereto. As shown in FIGS. 7 and 8, one end of hydraulic cylinder 90 is pivotally mounted on body 72 and the other end thereof is pivotally mounted on body 81. The movable portion 80 of clamping means 70 is provided with latching means in the form of angle iron member 91 attached, as by welding, to body 81. Member 91 is disposed so that a flange thereof extends from body 81 in a plane parallel to the direction of movement of cylinder 90 and between frame member 61 of carrying means 60 and machine frame 11, as shown in FIG. 8. Latching is accomplished by operating hydraulic cylinder 90 to move portions 71 and 80 of clamping means 70 apart a sufficient distance so that the flange of member 91 engages frame member 61 as indicated in dotted lines in FIG. 8. As a result, clamping means 70 is locked against pivotally movement. A stop member 92 is provided on machine frame 11 as shown in FIGS. 1 and 9 at a position where it will contact channel member 77 and thereby limit the extent of pivotal movement of clamping means 70 to about 180 degrees.

The operation of harvesting machine 10 is begun by moving the two parts 10a and 10b into position on opposite sides of the trunk of a tree bearing fruit to be harvested as shown in FIG. 1. The shaking means, in this illustrative machine being of the type shown at 14, is operated to impart vibratory motion to the tree. The fruit, for example apples, removed by the motion falls onto machine frames 11a and 11b, being decelerated by the strips 22a, 22b. The fruit lands on conveyors 17a, 17b which transport it in an outward direction from the tree to conveyors 19a, 19b which, in turn, transport the fruit to a point of collection relative to each frame. In this particular example, points of collection are at the end of each sizer 21a, 21b. The fruit is collected at this point by the crop collection system of the present invention which operates in the following manner.

Prior to beginning of the harvesting operation, a plurality of bins or receptacles such as receptacles 30 or 32 as shown in FIGS. 2 and 3, respectively, are placed in a row on conveyor 40. Receptacles of the type designated 30 would be placed thereon with the receptacle bottom resting on chains 41, 42 as shown in FIG. 5. Those of the type designated 32 are placed on conveyor 40 with the slats 34 thereof resting on conveyor chains 41, 42. As a result, a plurality of bins for collecting crops are carried with machine 10 as it moves in a field between the various plants and trees.

When harvesting by machine 10 begins, a bin or receptacle is placed so that the open end thereof is in communication with the point of crop collection. The operator first activates conveyor drive motor 50 through an appropriate control or console 25 to move chains 41, 42 and hence the row of bins thereon a sufficient amount so that the first one in the row is moved onto platform 51. Movement of a bin from chains 41, 42 onto platform 51 is facilitated by rollers 54 in platform 51 and by the action of chains 41, 42 on the remaining bins in the row which tend to push the first bin off chains 41, 42 onto platform 51. Depending upon the type of receptacle either the depending legs 31 or slats 34 thereof rest on rollers 54. The fact that platform 51 is wider than the distance between chains 41, 42 and that the level of platform 51 is spaced a short distance below the level of chains 41, 42 accommodates bins of the type shown at 30 in FIG. 2 as previously described.

Once on platform 51, a bin or receptacle is moved into position on carrying means 60 in the following manner. Carrying means 60 initially is in a position as shown in FIG. 10 where the lower portion thereof is horizontal, and clamping means 70 is latched in carrying means 60 as shown in FIG. 7. The operator activates the appropriate controls on console 25 so as to retract hydraulic cylinder 90 a distance sufficient to unlatch clamping means 70 and to retract hydraulic cylinder 67 so as to tilt carrying means 60 downwardly to the position shown in FIG. 12. As a result, clamping means 70 swings outwardly, pivoting freely about rod 75 through an angle of about 180 degrees to a position such as that shown in broken lines in FIG. 4 and full lines in FIG. 9. Any further travel of clamping means 70 is limited by stop member 92, and this position is maintained when the operator extends hydraulic cylinder 67 to return carrying means 60 to a position as shown in FIG. 10 where the bottom portion thereof is generally horizontal.

Clamping means 70 is now in position to grip the bin resting on platform 51, and the operator adjusts the spacing between the jaws of clamping means 70 by extending or retracting hydraulic cylinder 90 in a suitable manner. As a result, the bin which is designated generally at B in FIG. 9 is firmly grasped by clamping means 70 and ready to be moved.

Clamping means 70 and the bin B gripped by the jaws thereof next are returned to a position where bin B is placed on carrying means 60. To this end, the operator retracts hydraulic cylinder 67 so that carrying means 60 is tilted downwardly, as shown in FIG. 12, whereupon clamping means 70 with bin B pivots freely under the influence of gravity about rod 75 through an angle of about 180 degrees, returning to a position on carrying means 60 as shown in FIG. 8. The bin B thus is moved through a generally horizontal path to a location slightly above the lower, normally horizontal portion of carrying means 60. Clamping means 70 and bin B grasped thereby are maintained in this position when the operator extends hydraulic cylinder 67 to return carrying means 60 to the position of FIG. 10 where the bottom portion thereof is generally horizontal.

At this point the operator would extend hydraulic cylinder 90 by an amount sufficient to release the jaws of clamping means 70 from bin B and to engage latch member 91 with frame member 61. As a result, bin B rests freely on carrying means 60 to prevent any movement of clamping means 70 relative to carrying means 60.

The bin or receptacle next is swung through a generally vertical path whereby it is raised to an elevated position where the open end thereof is in communication with the point of collection of crops relative to machine 10. The operator simply extends hydraulic cylinder 67 by an amount sufficient to raise bin B on carrying means 60 to a level where the open end thereof is in communication with the outer or exit end of sizer 21. Then as crops begin to fill the bin, carrying means 60 is lowered gradually by a corresponding retraction of hydraulic cylinder 67. As a result, the crops fall through a substantially constant distance as the bin is filled. In fruit harvesting, this provides the advantageous result of minimizing bruising of the fruit.

A filled bin can be left on the ground, being removed from the machine, prior to the next step of taking another bin in the following manner. Carrying means 60, having been lowered gradually during filling of bin B, is lowered further to the downward tilted position shown in FIG. 12. The filled bin may slide a short distance rearwardly of machine 10 but in any event the outermost lower edge thereof will rest on the ground. Machine 10 then can be driven forward a short distance whereby the bin slides entirely off carrying means 60 and rests on the ground. This will not interfere with subsequent operation of machine 10 which will be traveling in a direction away from bin B. At a later time, perhaps at the conclusion of the harvesting performed by machine 10, the bin together with others similarly filled are picked up by a fork lift machine.

After a filled bin is removed from the machine, the next bin in the row or conveyor 40 is automatically moved into position for filling in a manner identical to that in which the first bin was positioned. Conveyor 40 is operated to move the bin on platform 51 whereupon carrying means 60 and clamping means 70 are operated in a manner as described hereinbefore.

The pivotal mounting of clamping means 70 to carrying means 60 enables the operations to be performed with only two hydraulic cylinders. Alternatively, clamping means 70 can be pivotally mounted to machine frame 11 at a location allowing similar movement thereof, in which case an additional hydraulic cylinder or similar motive means would be needed. It is contemplated also that the operation of the collection system can be automatic, in which case operation of hydraulic cylinders 67 and 70 would be programmed and perhaps lowering of the bin during filling would be done under control of a weight responsive device which also would command removal of the filled bin from the machine.

Clamping means 70 comprise part of a transfer means carried by machine frame 11 for moving a bin from conveyor 40 onto carrying means 60. Similarly, carrying means 60 together with the afore-mentioned transfer means comprise one form of a positioning means carried by machine frame 11 for receiving a bin from conveyor 40 and for elevating a bin to receive crops at the point of collection.

It is therefore apparent that the present invention accomplishes its intended objects. There is provided a collection system including conveyor 40 and platform 51 carried by the harvesting machine together with carrying means 60 and clamping means 70 wherein plurality of bins or receptacles are movable with the machine prior to their individual filling and wherein each bin is automatically moved into a position for filling. The arrangement of conveyor 40 and platform 51 providing the needed vertical clearance therebetween enables the collection system to operate equally well with bins or receptacles of various sizes and construction.

The arrangement of conveyor 40 and platform 51 which move bins or receptacles in a row toward the point of crop collection, together with clamping means 70 and carrying means 60 which take each bin and raise it so that the open end thereof is in communication with the point of collection does not impair or detract from the high degree of maneuverability and low profile designed into machine 10. The operation of carrying means 60 whereby the crops fall through a substantially constant distance during filling of a bin thereby minimizing any bruising of the crops.

While a single specific embodiment of the present invention has been described in detail, this has been done for the purpose of illustration without thought of limitation.

I claim:

1. In a harvesting machine including a frame movable in a field between the various plants, crop removal means carried by said frame, and conveying means in said frame adapted to receive removed crops and transport them to a point of collection relative to said frame, a system for collecting crops from that point comprising:
   (a) carrying means mounted to said frame and adapted to support a bin or receptacle during loading thereof;
   (b) a conveyor carried by said frame and adapted to move a plurality of bins in a direction toward said point of collection;
   (c) drive means carried by said frame and operatively connected to said conveyor; and
   (d) transfer means carried by said frame for moving a bin from said conveyor onto said carrying means.

2. The collection system defined in claim 1 wherein said carrying means is pivotally mounted to said frame and movable through a vertical plane, said transfer means being movable through a generally horizontal plane.

3. The collection system defined in claim 2 wherein said transfer means includes clamping means comprising:
   (a) a first portion having an extension defining a first jaw; and
   (b) a second portion movably connected to said first portion and having an extension defining a second jaw.

4. The collection system defined in claim 1 wherein said conveyor comprises:
   (a) a driven portion including two spaced-apart parallel chains; and
   (b) a platform having rollers therein and disposed in a horizontal plane below the plane of said parallel chains.

5. The collection system defined in claim 2 together with means for moving said carrying means, wherein said means for moving said carrying means and said transfer means comprises:
   (a) a first hydraulic cylinder operatively connected to said carrying means and to said machine frame; and
   (b) a second hydraulic cylinder operatively connected to said transfer means.

6. In a harvesting machine including a frame movable in a field between the various plants, crop removal means carried by said frame, and conveying means in said frame adapted to receive removed crops and transport them to a point of collection relative to said frame, a system for collecting crops from that point comprising:
   (a) a conveyor carried by said frame and adapted to move a plurality of bins in a direction toward said point of collection;
   (b) drive means carried by said frame and operatively connected to said conveyor; and
   (c) positioning means carried by said frame for receiving a bin from said conveyor and for elevating a bin to receive crops at said point of collection.

7. The collection system defined in claim 6 wherein said positioning means comprises:
   (a) carrying means movably mounted to said frame and adapted to support a bin during loading thereof; and
   (b) transfer means for moving a bin from said conveyor onto said carrying means.

8. The collection system defined in claim 7 wherein said carrying means is moved through a generally vertical plane and said transfer means is moved through a generally horizontal plane.

9. The collection system defined in claim 7 wherein said transfer means is pivotally mounted to said carrying means.

10. The collection system defined in claim 7 wherein said transfer means includes clamping means comprising:
    (a) a first portion having an extension defining a first jaw; and
    (b) a second portion movably connected to said first portion and having an extension defining a second jaw.

11. The collection system defined in claim 6 wherein said conveyor comprises:
    (a) a driven portion including two spaced-apart parallel chains; and
    (b) a platform having rollers thereon and disposed in a horizontal plane below the plane of said parallel chains.

12. A method of collecting fruit after it is removed from a tree by a harvesting machine of the type including crop removal means carried by an ambulatory frame provided with conveying means for transporting removed fruit to a point of collection relative to the frame, comprising the steps of:
    (a) placing a plurality of bins or receptacles, for storing fruit, on a conveyor carried by the machine frame;
    (b) moving the bins, one at a time, to a location near the point of collection;
    (c) taking a bin and elevating it relative to the point of collection; and
    (d) lowering the bin gradually as it is filled with fruit.

13. The method defined in claim 11 wherein said step of taking and raising comprises the steps of:
    (a) grasping a bin;
    (b) moving the bin through a first, generally horizontal path; and
    (c) moving the bin through a second, generally vertical path.

14. The method defined in claim 11 further comprising the step of leaving a filled bin on the ground, removed from the machine, prior to the next step of taking another bin.

References Cited
UNITED STATES PATENTS

| | | | |
|---|---|---|---|
| 3,218,790 | 11/1965 | Edgemond, Jr. | 56—329 |
| 3,486,316 | 12/1969 | Steingas et al. | 56—329 |
| 3,531,925 | 10/1970 | Vines et al. | 56—329 |

RUSSELL R. KINSEY, Primary Examiner